United States Patent
Kjær et al.

(10) Patent No.: US 9,856,855 B2
(45) Date of Patent: Jan. 2, 2018

(54) DISABLEMENT OF WIND TURBINES IN A WIND PARK

(75) Inventors: Martin Ansbjerg Kjær, Harlev J (DK); Jesper Sandberg Thomsen, Hadsten (DK); Per Brath, Randers Nv (DK); Søren Dalsgaard, Hadsten (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 547 days.

(21) Appl. No.: 14/129,585

(22) PCT Filed: Jun. 29, 2012

(86) PCT No.: PCT/DK2012/050219
§ 371 (c)(1),
(2), (4) Date: Apr. 4, 2014

(87) PCT Pub. No.: WO2013/000473
PCT Pub. Date: Jan. 3, 2013

(65) Prior Publication Data
US 2014/0207296 A1    Jul. 24, 2014

Related U.S. Application Data

(60) Provisional application No. 61/503,412, filed on Jun. 30, 2011.

(30) Foreign Application Priority Data

Jun. 30, 2011   (DK) .................................. 2011 70352

(51) Int. Cl.
*F03D 7/00*    (2006.01)
*F03D 7/02*    (2006.01)
*F03D 7/04*    (2006.01)

(52) U.S. Cl.
CPC ............. *F03D 7/00* (2013.01); *F03D 7/0264* (2013.01); *F03D 7/0292* (2013.01); *F03D 7/048* (2013.01);
(Continued)

(58) Field of Classification Search
CPC ........ F03D 7/00; F03D 7/0264; F03D 7/0292; F03D 7/048; F03D 7/0224; F03D 7/0228;
(Continued)

(56) References Cited

U.S. PATENT DOCUMENTS 6,643,613 B2 * 11/2003 McGee ............... G06F 11/0709
                                                                700/51
7,876,061 B2 *  1/2011 Wright .................... H02J 3/008
                                                                290/40 B
(Continued)

FOREIGN PATENT DOCUMENTS

EP    1571746 A1    9/2005
EP    1790851 A2    5/2007
(Continued)

OTHER PUBLICATIONS

Machine translation of EP 2302208.*
(Continued)

*Primary Examiner* — Sean Shechtman
*Assistant Examiner* — Tri T Nguyen
(74) *Attorney, Agent, or Firm* — Patterson + Sheridan, LLP (57) ABSTRACT

Embodiments of the invention generally relate to wind turbine generators, and more specifically to the deactivation of wind turbines in a wind turbine park. A wind park controller may be configured to retrieve data indicating fatigue experienced by each wind turbine of the wind turbine
(Continued)

park, and deactivate those turbines determined to be the most fatigued, thereby increasing the lifetime of turbines in the wind turbine park.

20 Claims, 4 Drawing Sheets

(52) U.S. Cl.
CPC ....... *F05B 2270/332* (2013.01); *Y02E 10/723* (2013.01)

(58) Field of Classification Search
CPC ........ F03D 7/026; F03D 7/028; F03D 7/0284; F03D 7/043; F03D 7/044; F03D 7/045; F03D 7/046; F03D 7/047; F05B 2270/332; Y02E 10/723; Y02E 10/40; Y02E 10/50; Y02E 10/563; Y02E 10/58; Y02E 10/70; H02J 3/383; H02J 3/385; H02J 3/386
See application file for complete search history.

(56) References Cited

U.S. PATENT DOCUMENTS

| | | | |
|---|---|---|---|
| 9,140,239 B2* | 9/2015 | Dalsgaard | ............. F03D 7/0264 |
| 2004/0230377 A1* | 11/2004 | Ghosh | ................... F03D 7/0284 702/3 |
| 2007/0124025 A1* | 5/2007 | Schram | ................. F03D 7/0224 700/287 |
| 2010/0179773 A1 | 7/2010 | Altemark | |
| 2010/0209245 A1* | 8/2010 | Migliori | .................. F01D 17/10 416/1 |
| 2011/0140428 A1* | 6/2011 | Wakata | ................. F03D 7/0284 290/44 |
| 2011/0245935 A1* | 10/2011 | Katou | ...................... G05B 9/03 700/21 |
| 2013/0103202 A1* | 4/2013 | Bowyer | ................ F03D 7/0292 700/275 |

FOREIGN PATENT DOCUMENTS

| | | |
|---|---|---|
| EP | 2302207 A1 | 3/2011 |
| GB | 2476506 A | 6/2011 |

OTHER PUBLICATIONS

International Search Report; PCT/DK2012/050219; dated Oct. 12, 2012.

DK Search Report; PA201170352; dated Jan. 24, 2012.

* cited by examiner

DISABLEMENT OF WIND TURBINES IN A WIND PARK

FIELD OF THE INVENTION

Embodiments of the invention generally relate to wind turbine generators, and more specifically to the disablement of wind turbines in a wind turbine park.

BACKGROUND

In recent years, there has been an increased focus on reducing emissions of greenhouse gases generated by burning fossil fuels. One solution for reducing greenhouse gas emissions is developing renewable sources of energy. Particularly, energy derived from the wind has proven to be an environmentally safe and reliable source of energy, which can reduce dependence on fossil fuels.

Energy in wind can be captured by a wind turbine, which is a rotating machine that converts the kinetic energy of the wind into mechanical energy, and the mechanical energy subsequently into electrical power. Common horizontal-axis wind turbines include a tower, a nacelle located at the apex of the tower, and a rotor that is supported in the nacelle by means of a shaft. The shaft couples the rotor either directly or indirectly with a rotor assembly of a generator housed inside the nacelle. A plurality of wind turbine generators may be arranged together in a wind park or wind power plant to generate sufficient energy to support a grid.

The availability of wind resources and the requirements of the grid to which they are connected may vary over time. Accordingly, it is possible that, at certain times, wind turbines in a wind park have the capability to produce a greater amount of power than is required on the grid. Accordingly, one or more turbines in the wind park may be disabled.

SUMMARY OF THE INVENTION

Embodiments of the invention generally relate to wind turbine generators, and more specifically to the disablement of wind turbines in a wind turbine park.

One embodiment of the invention provides a method for operating a plurality of wind turbines in a wind farm. The method generally comprises determining that one or more wind turbines of the plurality of wind turbines should be deactivated, retrieving data indicating fatigue experienced by each wind turbine of the plurality of wind turbines, and selecting one or more wind turbines of the plurality of wind turbines determined to have a greatest fatigue to be deactivated.

Another embodiment of the invention provides a controller for controlling a plurality of wind turbines in a wind farm. The controller is generally configured to determine that one or more wind turbines of the plurality of wind turbines should be deactivated, retrieve data indicating fatigue experienced by each wind turbine of the plurality of wind turbines, and select one or more wind turbines of the plurality of wind turbines determined to have a greatest fatigue to be deactivated.

Yet another embodiment of the invention provides a wind power plant comprising a plurality of wind turbines and a controller. The controller is generally configured to determine that one or more wind turbines of the plurality of wind turbines should be deactivated, retrieve data indicating fatigue experienced by each wind turbine of the plurality of wind turbines, and select one or more wind turbines of the plurality of wind turbines determined to have a greatest fatigue to be deactivated.

BRIEF DESCRIPTION OF THE DRAWINGS

Embodiments of the present invention are explained, by way of example, and with reference to the accompanying drawings. It is to be noted that the appended drawings illustrate only examples of embodiments of this invention and are therefore not to be considered limiting of its scope, for the invention may admit to other equally effective embodiments.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention.

Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Figure 1:
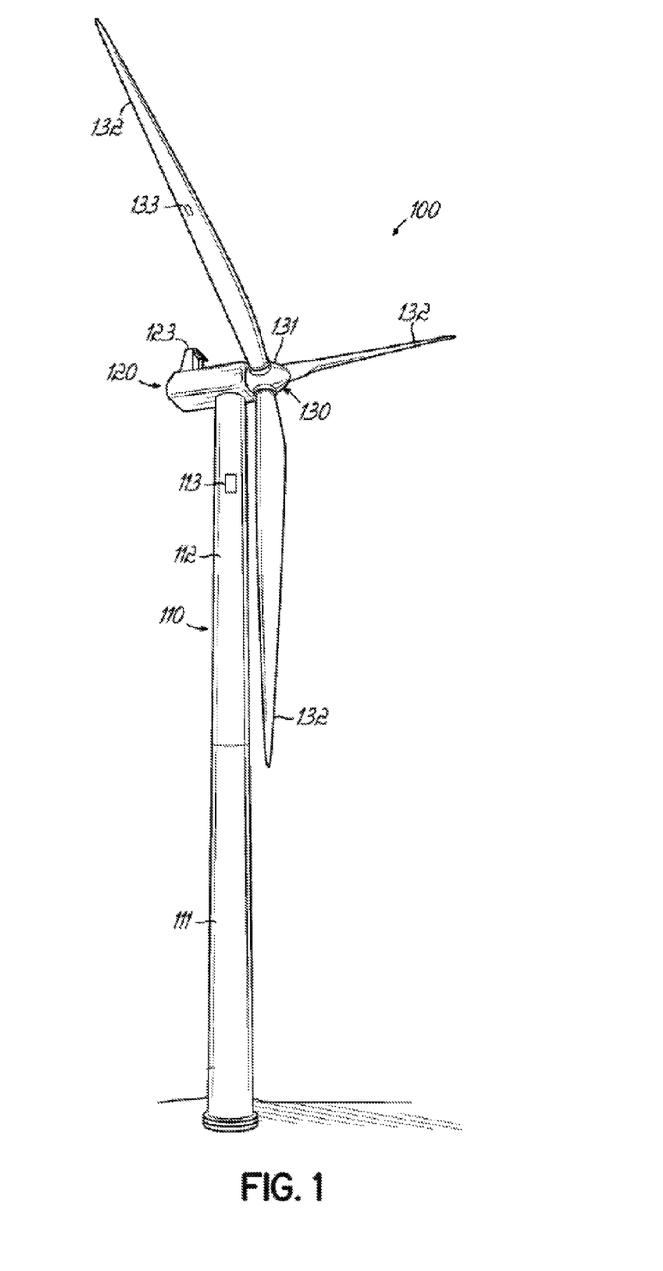
FIG. 1 illustrates an exemplary wind turbine according to an embodiment of the invention.

FIG. 1 illustrates an exemplary wind turbine 100 according to an embodiment of the invention. As illustrated in FIG. 1, the wind turbine 100 includes a tower 110, a nacelle 120, and a rotor 130. In one embodiment of the invention, the wind turbine 100 may be an onshore wind turbine. However, embodiments of the invention are not limited only to onshore wind turbines. In alternative embodiments, the wind turbine 100 may be an off shore wind turbine located over a water body such as, for example, a lake, an ocean, or the like.

The tower 110 of wind turbine 100 may be configured to raise the nacelle 120 and the rotor 130 to a height where strong, less turbulent, and generally unobstructed flow of air may be received by the rotor 130. The height of the tower 110 may be any reasonable height. The tower 110 may be made from any type of material, for example, steel, concrete, or the like. In some embodiments the tower 110 may be made from a monolithic material. However, in alternative embodiments, the tower 110 may include a plurality of sections, for example, two or more tubular steel sections 111 and 112, as illustrated in FIG. 1. In some embodiments of the invention, the tower 110 may be a lattice tower. Accordingly, the tower 110 may include welded steel profiles.

The rotor 130 may include a rotor hub (hereinafter referred to simply as the "hub") 131 and at least one blade 132 (three such blades 132 are shown in FIG. 1). The rotor hub 131 may be configured to couple the at least one blade 132 to a shaft (not shown). In one embodiment, the blades 132 may have an aerodynamic profile such that, at predefined wind speeds, the blades 132 experience lift, thereby causing the blades to radially rotate around the hub. The nacelle 120 may include one or more components configured to convert aero-mechanical energy of the blades to rotational energy of the shaft, and the rotational energy of the shaft into electrical energy.

The wind turbine 100 may include a plurality of sensors for monitoring a plurality of parameters associated with, for example, environmental conditions, wind turbine loads, performance metrics, and the like. For example, a strain gauge 133 is shown on the blade 132. In one embodiment, the strain gauge 133 may be configured to detect bending and or twisting of the blades 132. The information regarding bending and twisting of the blades may be necessary to perform one or more operations that reduce the loads on the blades 132 that may occur, for example, during high wind gusts. In such situations, the blades may be pitched to reduce the loads, thereby preventing damage to the blades.

FIG. 1 also illustrates an accelerometer 113 that may be placed on the tower 110. The accelerometer 113 may be configured to detect horizontal movements and bending of the tower 110 that may be caused due to the loads on the wind turbine 100. The data captured by the accelerometer 113 may be used to perform one or more operations for reducing loads on the wind turbine 100. In some embodiments of the invention, the accelerometer 113 may be placed on the nacelle 120.

FIG. 1 also depicts a wind sensor 123. Wind sensor 123 may be configured to detect a direction of the wind at or near the wind turbine 100. By detecting the direction of the wind, the wind sensor 123 may provide useful data that may determine operations to yaw the wind turbine 100 into the wind. The wind sensor 123 may use the speed and direction of the wind to control blade pitch angle. Wind speed data may be used to determine an appropriate pitch angle that allows the blades 132 to capture a desired amount of energy from the wind or to avoid excessive loads on turbine components. In some embodiments, the wind sensor 123 may be integrated with a temperature sensor, pressure sensor, and the like, which may provide additional data regarding the environment surrounding the wind turbine. Such data may be used to determine one or more operational parameters of the wind turbine to facilitate capturing of a desired amount of energy by the wind turbine 100 or to avoid damage to components of the wind turbine.

In one embodiment of the invention, a light detection and ranging (LIDAR) device 180 may be provided on or near the wind turbine 100. For example, the LIDAR 180 may be placed on a nacelle, hub, and/or tower of the wind turbine, as illustrated in FIG. 1. In alternative embodiments, the LIDAR 180 may be placed in one or more blades 132 of the wind turbine 100. In some other embodiments, the LIDAR device may be placed near the wind turbine 100, for example, on the ground as shown in FIG. 1. In general, the LIDAR 180 may be configured to detect wind speed and/or direction at one or more points in front of the wind turbine 100. In other words, the LIDAR 180 may allow the wind turbine to detect wind speed before the wind actually reaches the wind turbine. This may allow wind turbine 100 to proactively adjust one or more of blade pitch angle, yaw position, and like operational parameters to capture greater energy from the wind, and reduce loads on turbine components. In some embodiments, a controller may be configured to combine the data received from a LIDAR device 180 and the wind sensor 123 to generate a more accurate measure of wind speed and/or direction.

While a strain gauge 133, accelerometer 113, and wind sensor 123 are described herein, embodiments of the invention are not limited to the aforementioned types of sensors. In general, any type and number of sensors may be placed at various locations of the wind turbine 100 to facilitate capturing data regarding structural health, performance, damage prevention, acoustics, and the like. For example, a pitch angle sensor may be placed at or near a wind turbine blade to determine a current pitch angle of the blade.

Figure 2:
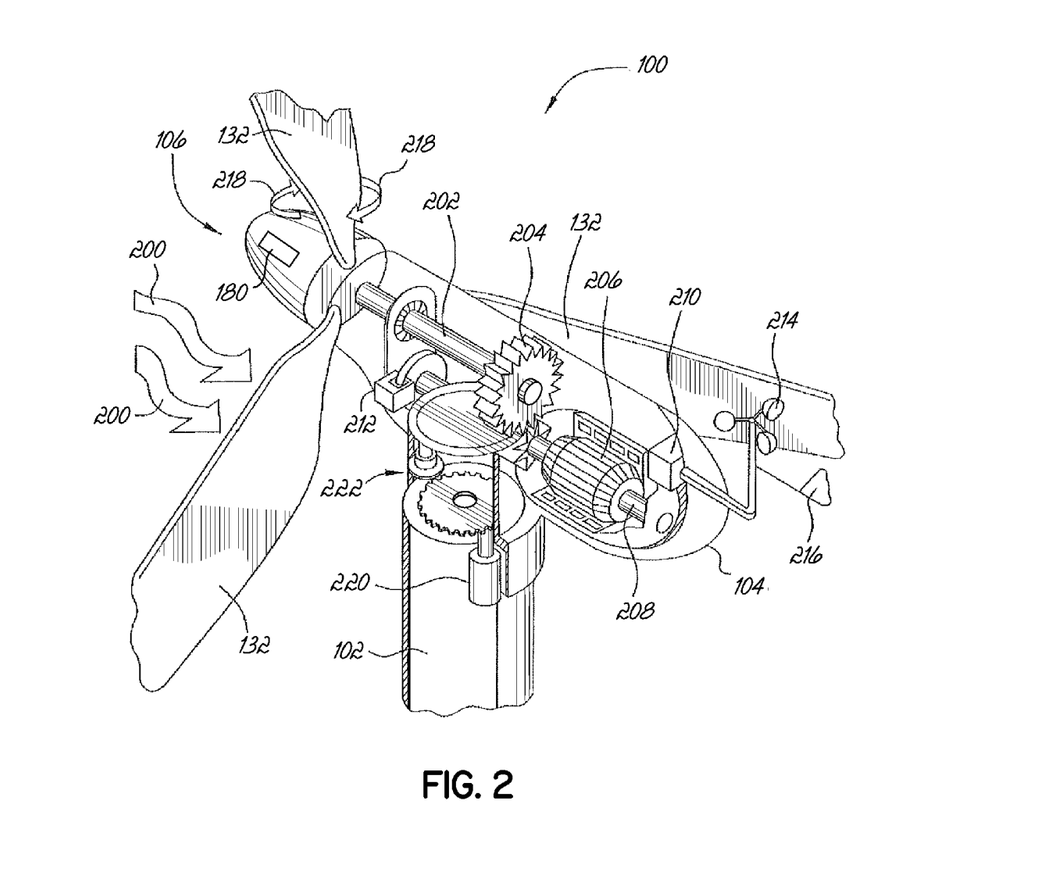
FIG. 2 illustrates an exemplary nacelle according to an embodiment of the invention.

FIG. 2 illustrates a diagrammatic view of typical components internal to the nacelle 120 and tower 110 of a wind turbine generator 100. When the wind 200 pushes on the blades 132, the rotor 130 spins, thereby rotating a low-speed shaft 202. Gears in a gearbox 204 mechanically convert the low rotational speed of the low-speed shaft 202 into a relatively high rotational speed of a high-speed shaft 208 suitable for generating electricity using a generator 206. In an alternative embodiment, the gear box may be omitted, and a single shaft, e.g., the shaft 202 may be directly coupled with the generator 206.

A turbine controller 210 may sense the rotational speed of one or both of the shafts 202, 208. If the controller decides that the shaft(s) are rotating too fast, the controller may signal a braking system 212 to slow the rotation of the shafts, which slows the rotation of the rotor 106, in turn. The braking system 212 may prevent damage to the components of the wind turbine generator 100. The turbine controller 210 may also receive inputs from an anemometer 214 (providing wind speed) and/or a wind vane 216 (providing wind direction). Based on information received, the controller 210 may send a control signal to one or more of the blades 132 in an effort to adjust the pitch 218 of the blades. By adjusting the pitch 218 of the blades with respect to the wind direction, the rotational speed of the rotor (and therefore, the shafts 202, 208) may be increased or decreased. Based on the wind direction, for example, the controller 210 may send a control signal to an assembly comprising a yaw motor 220 and a yaw drive 222 to rotate the nacelle 104 with respect to the tower 102, such that the rotor 106 may be positioned to face more (or, in certain circumstances, less) upwind.

The generator 206 may be configured to generate a three phase alternating current based on one or more grid requirements. In one embodiment, the generator 206 may be a synchronous generator. Synchronous generators may be configured to operate at a constant speed, and may be directly connected to the grid. In some embodiments, the generator 206 may be a permanent magnet generator. In alternative embodiments, the generator 206 may be an asynchronous generator, also sometimes known as an induction generator. Induction generators may or may not be directly connected to the grid. For example, in some embodiments, the generator 206 may be coupled to the grid via one or more electrical devices configured to, for example, adjust current, voltage, and other electrical parameters to conform with one or more grid requirements. Exemplary electrical devices include, for example, inverters, converters, resistors, switches, transformers, and the like.

Embodiments of the invention are not limited to any particular type of generator or arrangement of the generator and one or more electrical devices associated with the generator in relation to the electrical grid. Any suitable type of generator including (but not limited to) induction generators, permanent magnet generators, synchronous generators, or the like, configured to generate electricity according to grid requirements falls within the purview of the invention.

Figure 3:
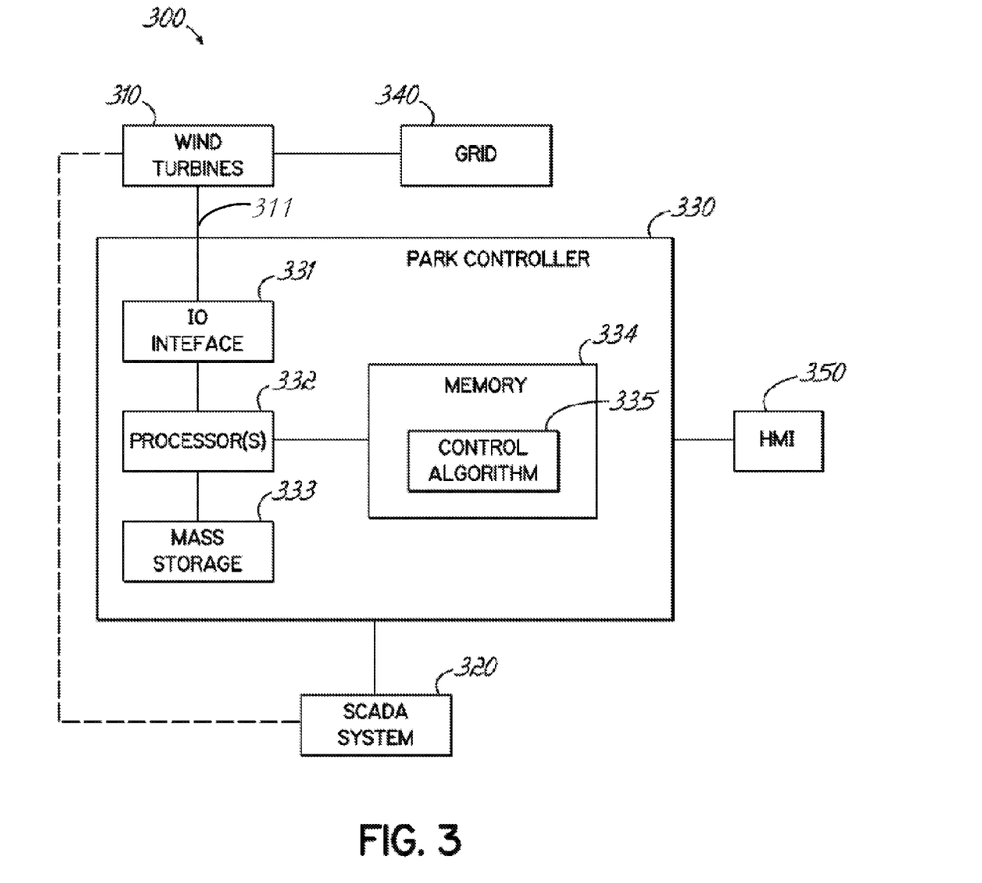
FIG. 3 illustrates an exemplary wind power plant according to an embodiment of the invention.

FIG. 3 illustrates an exemplary wind power plant 300 according to an embodiment of the invention. As illustrated, the wind power plant 300 may include a wind farm 310 coupled with a grid 340, a park controller 330, and a Supervisory Control And Data Acquisition (SCADA) system 320. The wind farm 310 may include one or more wind turbines, such as the representative wind turbine 100. The wind turbines collectively act as a generating plant ultimately interconnected by transmission lines with a power grid 340, which may be a three-phase power grid. The plurality of turbines of wind farm 310 may be gathered together at a common location in order to take advantage of the economies of scale that decrease per unit cost with increasing output. It is understood by a person having ordinary skill in the art that the wind farm 310 may include an arbitrary number of wind turbines of given capacity in accordance with a targeted power output.

The power grid 340 generally consists of a network of power stations, transmission circuits, and substations coupled by a network of transmission lines. The power stations generate electrical power by nuclear, hydroelectric, natural gas, or coal fired means, or with another type of renewable energy like solar and geothermal. Additional wind farms analogous to the wind farm 310 depicted may also be coupled with the power grid 340. Power grids and wind farms typically generate and transmit power using Alternating Current (AC).

The controller 330 can be implemented using one or more processors 331 selected from microprocessors, micro-controllers, digital signal processors, microcomputers, central processing units, field programmable gate arrays, programmable logic devices, state machines, logic circuits, analog circuits, digital circuits, and/or any other devices that manipulate signals (analog and/or digital) based on operational instructions that are stored in a memory 334.

Memory 334 may be a single memory device or a plurality of memory devices including but not limited to read-only memory (ROM), random access memory (RAM), volatile memory, non-volatile memory, static random access memory (SRAM), dynamic random access memory (DRAM), flash memory, cache memory, and/or any other device capable of storing digital information.

Mass storage device 333 may be a single mass storage device or a plurality of mass storage devices including but not limited to hard drives, optical drives, tape drives, non-volatile solid state devices and/or any other device capable of storing digital information. An Input/Output (I/O) interface 331 may employ a suitable communication protocol for communicating with the wind turbines of wind farm 310.

Processor 332 operates under the control of an operating system, and executes or otherwise relies upon computer program code embodied in various computer software applications, components, programs, objects, modules, data structures, etc. to read data from and write instructions to one or more wind turbines of wind farm 310 through I/O interface 331, whether implemented as part of the operating system or as a specific application.

A human machine interface (HMI) 350 is operatively coupled to the processor 332 of the controller 330 in a known manner. The HMI 350 may include output devices, such as alphanumeric displays, a touch screen, and other visual indicators, and input devices and controls, such as an alphanumeric keyboard, a pointing device, keypads, push-buttons, control knobs, etc., capable of accepting commands or input from the operator and transmitting the entered input to the processor 332.

In one embodiment of the invention, the controller 330 may be configured to generate a power reference signals to the wind turbines in the wind farm 310. Based on the power reference signal 311 the wind turbines in the wind farm 310 may adjust one or more operational parameters, e.g., blade pitch angles, so that the wind farm produces the power defined by the power reference signal. In one embodiment of the invention, the power reference signal may also be configured to activate and/or deactivate one or more turbines in the wind farm 310.

As described above, the available wind resources and the requirements of the grid 340 may vary over time. Therefore, it is possible that the capability of the wind turbines in wind park 310 may far exceed the power required by the grid. In such situations, one or more commands may be received from the grid, requesting that the amount power produced by the wind farm be curtailed. In such instances, the park controller 330, may deactivate one or more turbines in the wind farm 310 to reduce the amount of power produced.

In traditional wind power plants, the particular wind turbines that are selected for deactivation on a random basis, on the basis of a predefined priority scheme, or the like. However, different turbines of a wind park may face very different operating environments which may change over time. As a result different turbines may experience different amount of wear and tear, or fatigue. Embodiments of the invention provide methods, systems and apparatus for selectively deactivating turbines in a wind farm such that no particular wind turbine experiences excessive fatigue in relation to the other turbines.

In one embodiment of the invention, the park controller 330 may be configured to periodically or continuously collect fatigue data from the wind turbines of wind park 310. Examples of fatigue data may include, for example, data regarding failures, data from sensors (e.g., blade load sensors, tower load sensors), environmental conditions (e.g., wind speed and direction, turbulence), accumulated power production, relative position of the turbines in relation to one or more other turbines given the wind direction, and the like. The fatigue data collected by the park controller 330 may be stored in the memory 334 and/or the mass storage 333, in one embodiment of the invention.

In some embodiments, the fatigue data may be collected by the SCADA system 320 coupled to the wind farm 310. The SCADA system 320 may be configured to periodically or continuously collect fatigue data from the wind turbines of wind park 310 and store the data in a respective memory device or storage (not shown in FIG. 3). In such embodiments, the park controller 330 may be configured to retrieve the fatigue data from the SCADA system, when desired.

In one embodiment of the invention, the park controller 330 may be configured to selective deactivate one or more turbines of the wind farm 310 (for example, during a curtailment period) based on the fatigue data that is retrieved from the memory 334, mass storage 333, and/or the SCADA system 320. The fatigue data may include lifetime fatigue data and/or current or recently experienced fatigue data. Based on the fatigue data, the park controller 330 may determine which one of the wind turbines in wind farm 310 are most fatigued. The most fatigued turbines may then be prioritized for deactivation.

As suggested above, in one embodiment, the fatigue data considered by the park controller 330 may include fatigue data collected over a lifetime of each wind turbine. For example, in one embodiment, the controller 330 may retrieve data indicating a total number of failures or faults experienced by each turbine. The total number of failures or stops of each turbine may indicate a long term state of health of the wind turbine. In one embodiment, turbines having a relatively large number of faults and/or failures may highly prioritized for deactivation.

In one embodiment of the invention, the park controller 330 may retrieve data indicating a total number of alarms or faults associated with each wind turbine over a predefined time window (e.g., the last 4 hours, the last week, or the like). The alarms may include any type of alarm, for example, an alarm caused by a blade sensor indicating that there are excessive loads on the blade which may cause the blade damage. The total number of alarms for a turbine within a predefined time window may indicate a state of health of the turbine in the short term. In one embodiment of the invention, wind turbines having a relatively high number of alarms in the predefined time window may be given a higher priority for deactivation.

In one embodiment of the invention, the park controller may be configured to retrieve data indicating the total amount of power produced by each wind turbine. The total amount of power produced by each turbine may be strongly correlated to the loads experienced by components of the wind turbine, and therefore, the fatigue experienced by the turbine over its lifetime. Accordingly, in one embodiment, wind turbines with a relatively greater amount of lifetime power production may be prioritized for deactivation by the park controller 330.

In one embodiment of the invention, the park controller may be configured to consider current conditions that may impact fatigue of the wind turbines of wind farm 310. This may be because even within a wind park different wind turbines may experience significantly different wind conditions at a given time. Accordingly, in some embodiments, the park controller 330 may be configured to select wind turbines for deactivation based on the current conditions experienced by the wind turbines in the wind park 310.

For example, in one embodiment, the park controller 330 may be configured to retrieve data regarding current wind conditions and the relative positions of the wind turbines in wind park 310. As is known in the art, turbines that are in the wake of another turbine experience lower wind speeds and more turbulent wind conditions. In one embodiment of the invention, if a turbine is located in the wake of another turbine, it may be prioritized for disablement.

In one embodiment of the invention, the wind park controller 330 may be configured to retrieve current wind turbulence data from each of the wind turbines in wind park 310. For example, in one embodiment, each wind turbine may include blade load sensors that may be capable of indicating turbulence in the wind. The greater the turbulence in the wind the greater may be the loads experienced by the turbine. Accordingly, in one embodiment, the park controller 330 may be configured to prioritize wind turbines experiencing relatively greater turbulence for disablement.

In one embodiment of the invention, the wind park controller 330 may be configured to retrieve wind speed data from each of the wind turbines of the wind farm 310. At certain threshold wind speeds (e.g., greater than 25 m/s), the fatigue loads on the wind turbine may be too great and may cause damage to the turbine. Many wind turbines may automatically shut down in response to detecting a threshold level of wind speeds. In some embodiments, the park controller 330 may prioritize wind turbines experiencing extreme wind conditions closest to a predefined threshold for disablement. For example, suppose wind turbines automatically shut down upon detecting wind speeds greater than 25 m/s. If a first turbine detects wind speeds around 12 m/s and a second wind turbine detects wind speeds around 22 m/s, the park controller 330 may prioritize the second wind turbine for disablement because the second wind turbine is experiencing wind speeds closest to the threshold wind speed for automatic shut down.

While determining particular wind turbines to deactivate based on historical/lifetime data such as accumulated lifetime faults, number of alarms in a predefined time window, and accumulated power production, and based on current conditions such as wind speed, turbulence, and relative position of the wind turbines is disclosed herein, embodiments of the invention are not limited only to the above referenced factors. Any type of historical/lifetime data and current conditions data related to fatigue of the wind turbines may be used to prioritize which of the wind turbines of wind farm 310 should be deactivated.

Furthermore, the decision of which turbines should be deactivated may be based exclusively on historical/lifetime data, exclusively on current conditions data, or a combination of the historical/lifetime data and current conditions data. Any number of factors (such as the factors described hereinabove) related to the fatigue of wind turbines may be considered by the controller 330 to determine which turbines should be activated or deactivated.

In one embodiment, where the park controller 330 considers multiple factors for determining which turbines should be activated or deactivated, the park controller 330 may assign different relative priorities to each factor. For example, suppose a first turbine has experienced 20 lifetime faults and a second turbine has experienced 15 lifetime faults. Accordingly, based on the historical fault data it may seem that the second turbine should be activated and the first turbine deactivated. However, if the second wind turbine is experiencing extreme wind conditions which may damage the turbine, and the first wind turbine is not experiencing extreme wind conditions, then the park controller 330 may select the first turbine for activation (even though it has a higher number of lifetime faults), and select the second turbine for deactivation.

Figure 4:
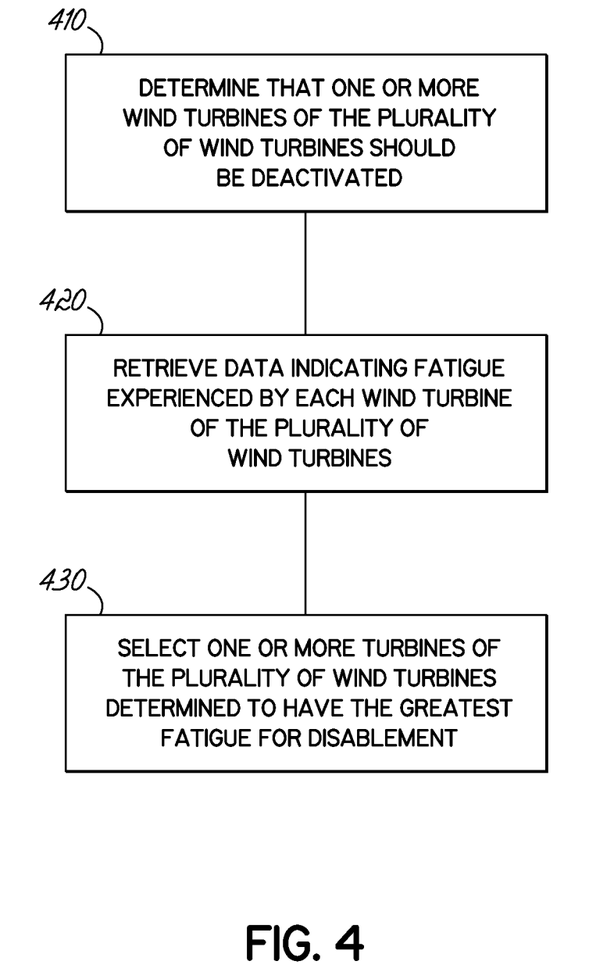
FIG. 4 is a flow diagram of exemplary operations performed by a wind power plant controller, according to an embodiment of the invention.

FIG. 4 is a flow diagram of exemplary operations that may be performed by a park controller to determine which of a plurality of wind turbines should be deactivated. The operations may begin in step 410 by determining that one or more wind turbines of a plurality of wind turbines need to be deactivated. The determination in step 410 may be made, for example, in response to receiving a power curtailment command from the grid. In step 420, the park controller may retrieve data indicating fatigue experienced by each wind turbine of the plurality of wind turbines. In step 430, the park controller may select the one or more wind turbines of the plurality of wind turbines determined to have a greatest fatigue to be deactivated.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

What is claimed is:

1. A method for operating a plurality of wind turbines in a wind farm, comprising:
   determining that one or more wind turbines of the plurality of wind turbines should be deactivated;
   retrieving data indicating fatigue experienced by each wind turbine of the plurality of wind turbines by:
      retrieving at least two different types of the data indicating fatigue experienced by each wind turbine; and
      assigning a respective priority to each type of the data based on comparing the fatigue indicated by the at least two different types of data, wherein the respective priority indicates a relative importance between each type of the data, and wherein the respective priorities are used to compare the fatigue experienced between two or more of the plurality of wind turbines when determining to deactivate the one or more wind turbines;
   selecting at least a first wind turbine of the plurality of wind turbines to deactivate based on the fatigue indicated by the type of the data with a highest priority;
   selecting at least a second wind turbine of the plurality of wind turbines to continue to operate based on the data indicating fatigue;
   deactivating the at least first wind turbine, wherein the at least second wind turbine is not deactivated; and
   operating the at least second wind turbine to produce a power according to a power reference signal to keep the wind farm operating, after deactivating the at least first wind turbine.

2. The method of claim 1, wherein the data indicating fatigue experienced by each wind turbine comprises data regarding current conditions which impact fatigue of each wind turbine.

3. The method of claim 2, wherein the data indicating fatigue experienced by each wind turbine comprises at least one of:
   wind speed;
   turbulence; and
   wind direction and a position of the wind turbine in relation to other wind turbines.

4. A controller for controlling a plurality of wind turbines in a wind farm, wherein the controller is configured to:
   determine that one or more wind turbines of the plurality of wind turbines should be deactivated;
   retrieve data indicating fatigue experienced by each wind turbine of the plurality of wind turbines by:
      retrieving at least two different types of the data indicating fatigue experienced by each wind turbine; and
      assigning a respective priority to each type of the data based on comparing the fatigue indicated by the at least two different types of data, wherein the respective priority indicates a relative importance between each type of the data, and wherein the respective priorities are used to compare the fatigue experienced between two or more of the plurality of wind turbines when determining to deactivate the one or more wind turbines;
   select at least a first wind turbine of the plurality of wind turbines to deactivate based on the fatigue indicated by the type of the data with a highest priority;
   select at least a second wind turbine of the plurality of wind turbines to continue to operate based on the data indicating fatigue;
   deactivate the at least first wind turbine, wherein the at least second wind turbine is not deactivated; and
   operate the at least second wind turbine to produce a power according to a power reference signal to keep the wind farm operating, after deactivating the at least first wind turbine.

5. The controller of claim 4, wherein the data indicating fatigue experienced by each wind turbine comprises data regarding current conditions which impact fatigue of each wind turbine.

6. The controller of claim 5, wherein the data indicating fatigue experienced by each wind turbine comprises at least one of:
   wind speed;
   turbulence; and
   wind direction and a position of the wind turbine in relation to other wind turbines.

7. A wind power plant comprising:
   a plurality of wind turbines; and
   a controller configured to:
      determine that one or more wind turbines of the plurality of wind turbines should be deactivated;
      retrieve data indicating fatigue experienced by each wind turbine of the plurality of wind turbines by:
         retrieving at least two different types of the data indicating fatigue experienced by each wind turbine; and
         assigning a respective priority to each type of the data based on comparing the fatigue indicated by the at least two different types of data, wherein the respective priority indicates a relative importance between each type of the data, and wherein the respective priorities are used to compare the fatigue experienced between two or more of the plurality of wind turbines when determining to deactivate the one or more wind turbines;
      select at least a first wind turbine of the plurality of wind turbines to deactivate based on the fatigue indicated by the type of the data with a highest priority;
      select at least a second wind turbine of the plurality of wind turbines to continue to operate based on the data indicating fatigue;
      deactivate the at least first wind turbine, wherein the at least second wind turbine is not deactivated; and
      operate the at least second wind turbine to produce a power according to a power reference signal to keep the wind power plant operating, after deactivating the at least first wind turbine.

8. The wind power plant of claim 7, wherein the data indicating fatigue experienced by each wind turbine comprises data regarding current conditions which impact fatigue of each wind turbine.

9. The wind power plant of claim 8, wherein the data indicating fatigue experienced by each wind turbine comprises at least one of:

wind speed;

turbulence; and wind direction and a position of the wind turbine in relation to other wind turbines.

10. The method of claim 1, wherein the at least first wind turbine experienced a larger number of faults than the at least second wind turbine.

11. The method of claim 1, wherein the at least first wind turbine received a larger number of alarms in a predefined time window than the at least second wind turbine.

12. The method of claim 1, wherein the at least first wind turbine produced a greater total amount of lifetime power than the at least second wind turbine.

13. The method of claim 1, wherein the at least first wind turbine experienced a greater turbulence than the at least second wind turbine.

14. The method of claim 1, wherein the at least first wind turbine experienced a wind speed higher than a threshold.

15. The method of claim 1, wherein the data indicating fatigue experienced by each wind turbine comprises historical fault data for each wind turbine.

16. The controller of claim 4, wherein the data indicating fatigue experienced by each wind turbine comprises historical fault data for each wind turbine.

17. The wind power plant of claim 7, wherein the data indicating fatigue experienced by each wind turbine comprises historical fault data for each wind turbine.

18. The method of claim 1, wherein the type of the data with the highest priority comprises total number of failures experienced by each wind turbine and the total number of failures experienced by each wind turbine is compared between two or more of the plurality of wind turbines.

19. The method of claim 1, wherein the type of the data with the highest priority comprises total number of alarms for each wind turbine and the total number of alarms for each wind turbine is compared between two or more of the plurality of wind turbines.

20. The method of claim 1, wherein the type of the data with the highest priority comprises total amount of power produced by each wind turbine and the total amount of power produced by each wind turbine is compared between two or more of the plurality of wind turbines.

* * * * *